United States Patent Office 3,211,929
Patented Oct. 12, 1965

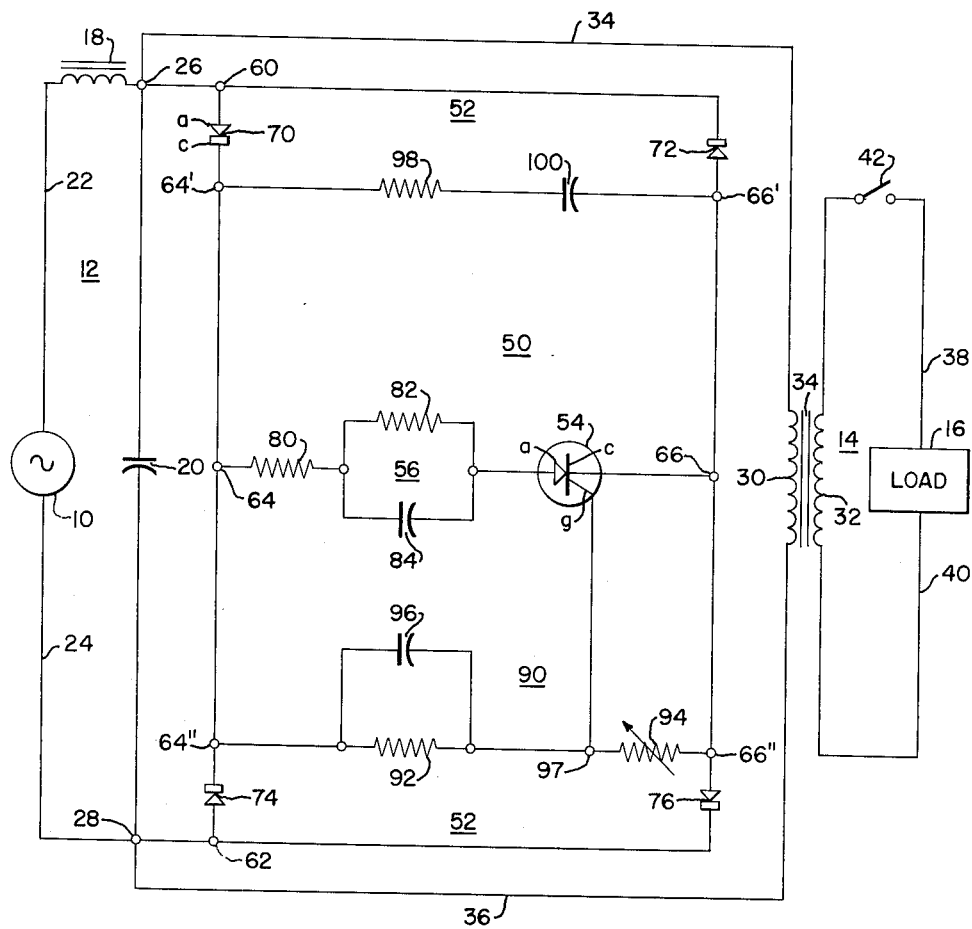

3,211,929
TRANSIENT SUPPRESSOR CIRCUIT
Frank J. Prines, Penn Hills Township, Allegheny County, and William H. Beck, Pittsburgh, Pa., assignors to Westinghouse Electric Corporation, Pittsburgh, Pa., a corporation of Pennsylvania
Filed Apr. 26, 1963, Ser. No. 275,974
8 Claims. (Cl. 307—93)

This invention relates in general to protective systems, and more particularly to transient suppressor circuits.

The alternating potential wave filter networks used in static inverters commonly produce transient over voltages and unidirectional voltage levels when the load on the static inverter is removed or reduced. When the load on the static inverter is removed or reduced, the wave filter produces a high level unidirectional voltage on the filter output capacitor in a direction determined by the alternating potential being applied to the filter output capacitor at the time of the load change. Further, the change in current through the filter inductor produces an alternating transient voltage. The unidirectional and alternating potentials, produced by the excess energy stored in the filter components upon removal or reduction of the load on the static inverter are both undesirable. The unidirectional transient is undesirable because it may saturate the output transformer of the static inverter, causing short circuit failure of the inverter with consequent damage to the inverter components. To provide an output transformer large enough to prevent saturation of the transformer core due to the unidirectional transient would increase the size, weight and cost of the inverter. The alternating transient potential is undesirable, as the voltage overshoot caused by said alternating potential transient may be greater than that allowed by the regulation specification of the apparatus.

Accordingly, it is an object of this invention to provide a new and improved protective system.

Another object of this invention is to provide a new and improved protective system for suppressing alternating transient potentials.

Another object of this invention is to provide a new and improved protective system for suppressing and absorbing unidirectional transient potentials.

A further obejct of this invention is to provide a new and improved protective system for suppressing the alternating and unidirectional transient potentials produced by the wave filter network of a static inverter when the load of the static inverter is removed or reduced.

Briefly, the present invention accomplishes the above cited objects by providing a protective system that will automatically connect a load to the output of the static inverter wave filter when the output voltage of the wave filter starts to increase. More specifically, when the output voltage of the inverter wave filter network begins to rise because of a removal or reduction of the load on the inverter, or any other condition that occurs to produce this effect, a static switching device is switched to its conducting state. This static switching device automatically connects an auxiliary load to the output terminals of the waveform filter, thus suppressing and absorbing the alternating and unidirectional potentials produced by the inverter waveform filter. After a period of time sufficient to allow the inverter waveform filter to reduce its stored energy to correspond to the new operating conditions imposed by the change in inverter load, the static switching device will switch back to its non-conducting state.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawing, in which the single FIGURE shows diagrammatically an embodiment of this invention.

Referring now to the drawing, the single FIGURE shows a source of alternating potential 10, which may be a static inverter system, along with alternating potential waveform filter network 12, an output transformer 14 and load circuit 16. Although the invention is described relative to suppressing alternating and unidirectional transient voltages in an inverter system, it will be obivous that the invention may be effectively used in any alternating potential system where alternating or unidirectional transient overvoltages, or both, are to be controlled and minimized.

More specifically, alternating potential source 10 is connected to output terminals 26 and 28 through line conductors 22 and 24,. respectively. The alternating potential waveform filter network 12, comprising filter choke or inductor 18 and output capacitor 20, has the filter inductor 18 connected, in this instance, between alternating potential source 10 and output terminal 26 in line conductor 22. The filter output capacitor 20 is connected between output terminals 26 and 28.

The output transformer 14 is comprised of windings 30 and 32 disposed in inductive relation with magnetic core 34. Windings 30 of output transformer 14 is connected to output terminals 26 and 28 of alternating potential source 10, through line conductors 34 and 36, respectively. Windings 32 of output transformer 14 is connected to load circuit 16 through line conductors 38 and 40.

In order to disconnect the load circuit from winding 32 of transformer 14, circuit interrupting device 42 is connected, in this instance, to interrupt line conductor 38.

In the operation of the inverter system just described, when the load circuit 16 is removed by the opening of disconnecting means 42, or the load imposed by load circuit 16 is reduced, the energy stored in the wave filter network 12 will produce alternating and unidirectional transient potentials. To prevent the unidirectional transient potential from saturating the magnetic core 34 of ouput transformer 14, a larger output transformer would have to be used than required by the circuit during steady state operation. Further, the alternating transient potential may increase the output voltage of alternating potential source to a magnitude exceeding the specified limits of the apparatus.

In order to suppress and dissipate these alternating and unidirectional transient potentials and, therefore, allow a smaller output transformer 14 to be utilized, as well as prevent the alternating potential from increasing beyond specified limits, protective system 50 is connected to the output terminals 26 and 28 of alternating potential source 10.

In general, protective system 50 is comprised of rectifying means 52, switching means 54 and an auxiliary load 56. When the output voltage of the alternating potential source 10 and wave filter network 12 exceeds a predetermined magnitude due to voltage transients, the switching means 54 will switch to a conducting state, allowing the voltage transients to be dissipated in auxiliary load 56. More specifically, rectifier means 52 is a full wave bridge type rectifier having input terminals 60 and 62 and output terminals 64 and 66. Rectifier means 52 may be comprised of rectifier devices 70, 72, 74 and 76, which may be semiconductor diodes each having a cathode electrode $c$ and an anode electrode $a$.

In order for bridge rectifier 52 to be responsive to the output voltage of alternating potential source 10 and filter network 12, the output terminals 26 and 28 of alternating potential source 10 are connected to the input terminals 60 and 62, respectively of bridge rectifier 52.

When bridge rectifier 52 is connected to alternating potential source 10, a unidirectional potential will be developed across the output terminals 64 and 66 of bridge rectifier 52 that will have an unchanging polarity. In other words, output terminal 64 of bridge rectifier 52 will be more positive than output terminal 66 of bridge rectifier 52, during both the positive and negative alternations of alternating potential source 10.

In order to render bridge rectifier 52 conductive, switching means 54 is connected across the unidirectional output terminals 64 and 66 of bridge rectifier 52. Switching means 54 may be a semiconductor controlled rectifier, as shown, having an anode electrode $a$, cathode electrode $c$ and a control or gate electrode $g$, or any other switching means, such as a transistor or Shockley diode.

Controlled rectifiers have the characteristic of blocking the flow of forward current with forward voltage applied to the device until the forward breakover voltage is reached, at which point the device switches to a conducting state with low voltage drop. Forward voltage being the condition where the anode electrode of the device is positive with respect to its cathode electrode. The forward voltage drop at which the controlled rectifier will become conductive may be substantially reduced by applying a firing or control pulse between the gate and cathode electrodes. Once the controlled rectifier is fired or made conductive by a control pulse, and the pulse removed, conduction is maintained until the anode-cathode current of the device falls below a sustaining value, such as by going through current reversal.

Controlled rectifier 54 has its anode electrode $a$ connected to the output terminal 64 of bridge rectifier 52 and its cathode electrode $c$ is connected to output terminal 66 of bridge rectifier 52. Thus, controlled rectifier 54 is poled in the forward or conducting direction and will switch to its conducting state when a control pulse is applied to its control or gate electrode $g$.

In order to provide a "dummy" or auxiliary load 56 for the bridge rectifier 52, impedance means or resistor 82 and capacitor 84 are connected in parallel circuit relation with impedance means or resistor 80, and the anode electrode $a$ of controlled rectifier 54. Thus, when controlled rectifier 54 switches to its conducting state, auxiliary load 56 is connected across the unidirectional output terminals 64 and 66 of bridge rectifier 52, allowing the stored energy produced transients of filter network 12 to be dissipated and absorbed by auxiliary load 56. The functioning of auxiliary load 56 will be described in greater detail hereinafter.

In order to switch controlled rectifier 54 to its conducting state when the voltage appearing at output terminals 26 and 28 of alternating potential source 10 is suddenly increased, such as by alternating and unidirectional transient voltages, control pulse producing means 90 is connected in circuit relation with the unidirectional output terminals 64″ and 66″ of bridge rectifier 52 and with the control or gate electrode $g$ of controlled rectifier 54. More specifically, control pulse producing means 90 may be a voltage dividing network comprising impedance means or resistors 92 and 94, and capacitor 96. Resistors 92 and 94 are serially connected between output terminals 64″ and 66″ of bridge rectifier 52, with resistor 92 being connected to output terminals 64″ and resistor 94 being connected to output terminal 66″. The junction 97 of resistors 92 and 94 is connected to the gate electrode $g$ of controlled rectifier 54. In order for any sudden increase in potential across resistors 92 and 94 to substantially appear only across resistor 94 and, therefore, apply a sharp increase in voltage to the gate electrode $g$ of controlled rectifier 54, capacitor 96 is connected across resistor 92. The voltage across a capacitor cannot change instantaneously because of the charging time of the capacitor. Therefore, when the voltage across output terminals 64″ and 66″ of bridge rectifier 52 increases suddenly due to transient voltages being applied to bridge rectifier 52, substantially the entire voltage increase will appear across resistor 94. The values of resistors 92 and 94 should be chosen so that during steady state operation, the voltage appearing at junction 97 will be just below the voltage required to provide a sufficient firing current to the gate electrode $g$ of controlled rectifier 54. Therefore, a slight voltage increase appearing across resistor 94 will cause controlled rectifier 54 to switch to its conducting state. By making resistor 94 adjustable, the sensitivity of the pulse producing circuit 90 may be varied. In order to prevent an excessive current drain through pulse producing network 90 during the period that protective circuit 50 is waiting for transient potentials to appear, the combined resistance of resistors 92 and 94 should be relatively large, limited only by the gate current necessary to fire controlled rectifier 54.

Normally, when controlled rectifier 54 is fired, it would conduct until the end of the voltage half cycle and switch back to its non-conducting state because of the voltage at the output terminals 64 and 66 of bridge rectifier 52 falling to zero every half cycle. Therefore, in order to keep controlled rectifier 54 in a conducting state until substantially all of the excess energy stored in filter network 12 has been dissipated, a capacitor 100 and resistor 98 may be connected across the output terminals 64′ and 66′ of bridge rectifier 52. During the steady state operation of alternating potential source 10, capacitor 100 will charge to the output voltage peak of bridge rectifier 52. When controlled rectifier 54 conducts due to receiving a signal pulse at its gate electrode $g$, capacitor 100 will begin to discharge through resistors 98 and 80, the parallel combination of resistor 82 and capacitor 84, and controlled rectifier 54. The rate of discharge of capacitor 100 and, therefore, the time that controlled rectifier 54 remains conductive may be controlled by selecting the proper magnitude of resistors 98, 80 and 82. Therefore, by selecting the discharge rate of capacitor 100 to exceed one or more cycles of the alternating potential 10, controlled rectifier 54 will not cease conduction at the end of the first voltage half cycle, but will continue to pass full wave rectified current until capacitor 100 has substantially discharged. When capacitor 100 no longer can supply sustaining current to controlled rectifier 54, controlled rectifier 54 will turn off at the end of the first half cycle following the point where capacitor 100 became substantially discharged. During the period of time that controlled rectifier 54 is conducting, capacitor 84 is charging, giving the appearance to the filter network output of alternating potential source 10 of a decreasing load, starting at the value of resistor 80 and decreasing exponentially until the controlled rectifier 54 becomes non-conducting. When controlled rectifier 54 becomes non-conductive, capacitor 84 will discharge through resistor 82. Capacitor 100 will again charge to the peak of the rectified voltage appearing across terminals 64′ and 66′ of bridge rectifier circuit 52, and the protective circuit 50 is thus "reset" to await another overvoltage condition of alternating potential source 10 and filter network 12.

In the operation of the protective system 50, during steady state operation of alternating potential source 10 and filter network 12, capacitor 100 will charge to the peak of the rectified voltage appearing at output terminals 64′ and 66′ of bridge rectifier 52. Resistor 94 should be selected or adjusted to give the protective circuit 50 the desired sensitivity and, therefore, determine what magnitude of voltage increase or rate of voltage rise appearing at output terminals 26 and 28 will cause controlled rectifier 54 to become conductive. Upon the removal of the load circuit 16 by the opening of circuit interrupting device 42, or upon a reduction of load imposed by load circuit 16, the filter network 12 will have to dissipate some of its stored energy to meet the newly imposed operating conditions. As hereinbefore stated, transient potentials of considerable magnitude, both alternating and undirectional, may be generated by the stored energy in filter network 12, with the result that the core 34 of output transformer may have to be made larger than ordinarily required in order to prevent saturation and short circuit failure of the alternating potential source or inverter system 10. Further, the alternating potential transient increase the voltage appearing across the primary winding 30 of output transformer 14 to a magnitude exceeding the specified maximum output potential of alternating source 10. Therefore, when the voltage suddenly increases across terminals 26 and 28, protective circuit 50 absorbs and dissipates the transient potentials. When the voltage increases suddenly at terminals 26 and 28 of alternating potential system 10, substantially the total voltage increase will appear across resistor 94 of pulse producing network 90, due to the presence of capacitor 96 across resistor 92. The voltage increase rate of voltage rise across resistor 94 applies sufficient current through the gate-cathode path of controlled rectifier 54 to cause controlled rectictifier 54 to switch from its blocking state to its conducting state. Therefore, a conducting path is established across the output terminals 64 and 66 of bridge rectifier 52. The initial loading of the protective circuit 50 on alternating potential source 10 is determined by the magnitude of resistor 80. As capacitor 84 starts to charge due to the rectified half cycle of voltage being applied to it, a load is placed across terminals 26 and 28 that starts at the value of resistor 80 and decreases exponentially until controlled rectifier 54 becomes non-conductive. The unidirectional component in the voltage applied to the auxiliary load circuit produced by the unidirectional transient, will be quickly absorbed by capacitor 84, and the alternating potential transient will be suppressed and dissipated by resistor 80 of the auxiliary load circuit 56. Resistor 82 is primarily a bleeding resistor of high resistance mangitude and dissipates the energy stored in capacitor 84 when controlled rectifier 54 ceases to conduct. In order to keep auxiliary load circuit 56 connected to terminals 26 and 28 for a time sufficient to allow filter network 12 to reduce its stored energy to a value compatible with its new operating conditions, capacitor 100 prevents controlled rectifier 54 from turning off at the end of the first voltage half cycle. As hereinbefore stated, capacitor 100 had charged during the steady state operation of alternating potential source 10. When controlled rectifier 54, is rendered conductive, capacitor 100 will begin to discharge through controlled rectifier 54, thus providing sustaining current for controlled rectifier 54 during the period of time the current alternations of the alternating potential source 10 and alternating transients fall to zero. The conduction period of controlled rectifier 54, determined by the magnitude of resistors 80, 82 and 98, should be made long enough to substantially dissipate the excess stored energy in filter network 12. During the period controlled rectifier 54 is conducting, capacitor 84 is charging towards the peak voltage being applied to it. Therefore, when controlled rectifier 54 becomes non-conducting when capacitor 100 had substantially discharged, capacitor 84 will discharge through resistor 82, thus dissipating its stored energy. Capacitor 100 is then recharged from the alternating potential source 10 through bridge rectifier 52 and resistor 98.

It is, therefore, apparent that the protective system disclosed will absorb and dissipate the alternating and unidirectional transient potentials produced in an alternating potential system, making it possible to maintain an alternating output voltage that does not exceed the specified maximum due to transient potential. Further, the protective system disclosed herein makes it possible for the output transformer of an inverter system to be sized according to the systems steady state specifications, without danger of saturating the core of the output transformer with the consequence short circuit failure of the inverter system, due to unidirectional transient potentials.

Other advantages of the disclosed protective system are the adjustable sensitivity of the circuit by adjustment of resistor 94, the controllable initial loading by choice of resistor 80, the low steady state dissipation because of the high combined resistance of resistors 92 and 94, the controllable conduction time of the controlled rectifier 54 by selection of resistors 98, 80 and 82, the controllable rate of auxiliary load decrease by selection of resistor 82 and capacitor 56, and the fact that one switching means 54 will operate during both the positive and negative alternations of the alternating potential source 10. Also, because protective system 50 only operates for a limited number of voltage alternations, the components of the system may have a rating which is a small fraction of the power the system will be called upon to dissipate, thus providing a system which is small in size and relatively inexpensive.

Since numerous changes may be made in the above described apparatus and different embodiments of the invention may be made without departing from the spirit thereof, it is inteneded that all matter contained in the foregoing description or shown in the accompanying drawings shall be interpreted as illustrative and not in a limiting sense. For example, the protective system disclosed herein may be utilized in polyphase systems by connecting a protective system in each phase. Further, the protective system is not limited for use with inverter systems, but may be used to advantage in any situation where it is desired to suppress alternating and unidirectional transient voltages in alternating potential systems.

Examples of other changes that may be made are the location of the protective circuit 50 on the secondary side of transformer 34, instead of the primary side as shown, or the location of the protective circuit 50 on the unidirectional bus feeding an inverter system to protect the inverter from failure due to unidirectonal voltage spikes. Also, the load resistor 80 may be located between the rectifier bridge circuit and the output terminals of the alternating potential source 10, without adversely affecting the operation of the protective circuit 50. Further, the holding circuit comprising resistor 98 and capacitor 100 could be relocated in the circuit to provide the same effect.

We claim as our invention:

1. An electric circuit for suppressing transient voltages in an alternating potential system comprising first means having input and output terminals, the input terminals of said first means being connected in circuit relation with said alternating potential system, the output terminals of said first means having the same polarity regardless of the polarity of the alternating potential system, second means having switching characteristics, said second means being connected in circuit relation with the output terminals of said first means, third means having electrical energy storage characteristics, said third means being connected in circuit relation with the output terminals of said first means and charged to a certain potential, fourth means, said fourth means being connected in series circuit relation with said second means, fifth means, said fifth means causing said second means to switch to a conducting state upon the occurrence of a predetermined electrical condition, said third means discharging through said second and fourth means when said second means switches to a conducting state, said fourth means controlling the discharge rate of said third means, said second means remaining in a conducting state until said third means has substantially discharged.

2. An electric circuit for suppressing transient voltages in an alternating potential system comprising rectifier means having input and output terminals, the input terminals of said rectifier means being connected in circuit relation with said alternating potential system, switching means, said switching means being connected in circuit relation with the output terminals of said rectifier means, capacitor means, said capacitor means being connected in circuit relation with said output terminals of said rectifier means and charged to a certain potential, impedance means, said impedance means being connected in series circuit relation with said switching means, means rendering said switching means conductive when the voltage appearing at the output terminals of said rectifier means exceeds a predetermined magnitude, said capacitor means discharging through said switching means and said impedance means when said switching means is rendered conductive, said switching means remaining conductive until said capacitor means has substantially discharged.

3. An electric circuit for suppressing transient voltages in an alternating potential system comprising first means having input and output terminals, the input terminals of said first means being connected in circuit relation with said alternating potential system, the output terminals of said first means providing a potential having the same polarity regardless of the polarity of the alternating potential system, second means having switching characteristics, said second means being connected in circuit relation with the output terminals of said first means, third means having energy storage characteristics, said third means being connected in circuit relation with the output terminals of said first means and charged to a certain potential, fourth means comprising energy storage means and impedance means, said fourth means being connected in circuit relation with said second means, fifth means, said fifth means causing said second means to switch to a conducting state when the potential appearing at the output terminals of said first means exceeds a predetermined magnitude, said third means discharging through said second and fourth means when said second means switches to a conducting state, the impedance means of said fourth means controlling the discharge rate of said third means, the energy storage means of said fourth means being charged during the period said second means is conductive, said second means remaining in a conducting state until said third means has substantially discharged, the energy storage means of said fourth means discharging through the impedance means of said fourth means when said second means switches to a non-conducting state.

4. An electric circuit for suppressing transient voltages in an alternating potential system comprising rectifier means having input and output terminals, the input terminals of said rectifier means being connected in circuit relation with said alternating potential system, switching means connected in circuit relation with the output terminals of said rectifier means, first capacitor means connected in circuit relation with said output terminals of said rectifier means and charged to a certain potential, first impedance means, second impedance means, second capacitor means, said first impedance means and said second capaictor means being connected in parallel circuit relation and the parallel circuit connected in series circuit relation with said switching means and said second impedance means between the output terminals of said rectifier means, means causing said switching means to switch to a conducting state when the potential appearing at the output terminals of said rectifier means exceeds a predetermined value, said first capacitor means discharging through said switching means when said switching means switches to a conducting state, said first and second impedance means controlling the discharge rate of said first capacitor means, said second capacitor means being charged during the period said switching means is conducting, said switching means remaining in a conducting state until said first capacitor means has substantially discharged, said second capacitor means discharging through said first impedance means when said switching means switches to a non-conducting state.

5. An electric circuit for suppressing transient voltages in an alternating potential system comprising rectifier means connected in a full wave bridge arrangement and having input and output terminals, the input terminals of said rectifier means being connected in circuit relation with said alternating potential system, semiconductor switching means having main electrodes and a control electrode, the main electrodes of said semiconductor switching means being connected in circuit relation with the output terminals of said rectifier means, first capacitor means connected in circuit relation with the output terminals of said rectifier means and charged to a certain potential, second capacitor means, first resistance means, second resistance means, said second capacitor means and said first resistance means being connected in parallel circuit relation and the parallel circuit connected in series circuit relation with the main electrodes of said semiconductor switching means and said second resistance means, means connected in circuit relation with the output terminals of said rectifier means and the control electrode of said semiconductor switching means applying a signal to said control electrode sufficient to cause said semiconductor switching means to switch to a conducting state when an electrical quantity appearing at the output terminals of said rectifier means exceeds a predetermined condition, said first capacitor means discharging through said semiconductor switching means, said second resistance means and said second capacitor means when said semiconductor switching means switches to a conducting state, said second resistance means controlling the discharge rate of said first capacitor means, said second capacitor means being charged during the period said semiconductor switching means is conductive, said semiconductor switching means being in a conductive state until said first capacitor means has substantially discharged, said second capacitor means discharging through said first resistance means when said semiconductor switching means switches to a non-conducting state.

6. An electric circuit for suppressing transient voltages in an alternating potential system comprising a full wave bridge rectifier having input terminals and positive and negative output terminals, the input terminals of said full wave bridge rectifier being connected in circuit relation with said alternating potential system, a controlled rectifier having anode, cathode and control electrodes, the anode and cathode electrodes of said controlled rectifier being connected in circuit relation with the output terminals of said bridge rectifier, said anode electrode being connected to the positive output terminal and said cathode being connected to the negative output terminal, first capacitance means connected in circuit relation with the output terminals of said bridge rectifier and charged to a certain potential, second capacitor means, first resistance means, second resistance means, said second capacitor means and said first resistance means being connected in parallel circuit relation and the parallel circuit connected in series circuit relation with the anode and cathode electrodes of said controlled rectifier and said second resistance means, third and fourth resistance means connected in series circuit relation with the output terminals of said bridge rectifier, said third resistance means being connected to the positive output terminal of said bridge rectifier, said fourth resistance means being connected to the negative output terminal of said bridge rectifier, the control electrode of said controlled rectifier being connected to the junction of said third and fourth resistance means, third capacitor means, said third capacitor means being connected across said third resistance means, said third capacitance means and said third and fourth resistance means applying a signal to the control electrode of said controlled rectifier sufficient to cause said controlled rectifier to switch to a conducting state when the potential applied to said bridge rectifier exceeds a predetermined value, said first capacitor means discharging through said controlled rectifier, said second resistance means and said second capacitor means when said controlled rectifier becomes conductive, said second resistance means controlling the discharge rate of said first capacitor means, said second capacitance means being charged during the period said controlled rectifier is conductive, said controlled rectifier remaining conductive until said first capacitor means has substantially discharged, said second capacitor means discharging through said first resistance means when said controlled rectifier becomes non-conductive.

7. In an inverter system having a waveform filter including an output capacitor, a transient suppressor circuit comprising a bridge rectifier having input and positive and negative polarity output terminals, the input terminals of said bridge rectifier being connected across the terminals of said output capacitor, a controlled rectifier having anode, cathode and control electrodes, the anode and cathode electrodes of said controlled rectifier being connected in circuit relation with the output terminals of said bridge rectifier, the cathode electrode of said controlled rectifier being connected to the negative output terminal of said bridge rectifier, first capacitance means connected in circuit relation with the output terminals of said bridge rectifier and charged to a certain potential, second capacitance means, first resistance means, second resistance means, said second capacitance means and said first resistance means being connected in parallel circuit relation and the parallel circuit connected in circuit relation with the anode electrode of said controlled rectifier, said second resistance means and the positive output terminal of said bridge rectifier, third resistance means, fourth resistance means, said third and fourth resistance means being connected in series circuit relation with the output terminals of said bridge rectifier, said third resistance means being connected to the positive output terminal of said bridge rectifier, said third resistance means being connected to the negative output terminal of said bridge rectifier, the control electrode of said controlled rectifier being connected to the junction of said third and fourth resistance means, third capacitance means connected across said third resistance means, said third capacitance means and said third and fourth resistance means applying a signal to the control electrode of said controlled rectifier of sufficient magnitude to cause said controlled rectifier to switch to a conducting state when an electrical quantity appearing at the output terminals of said bridge rectifier exceeds predetermined limits, said first capacitance means discharging through said controlled rectifier, said second resistance means and said second capacitance means when said controlled rectifier becomes conductive, said second resistance means controlling the discharge rate of said first capacitance means, said second capacitance means being charged during the period said controlled rectifier is conductive, said controlled rectifier remaining conductive until said first capacitance means has substantially discharged, said second capacitance means discharging through said first resistance means when said controlled rectifier becomes non-conductive.

8. In an inverter system having a waveform filter including an output capacitor, a transient suppressor circuit comprising a bridge rectifier having input terminals and positive and negative output terminals, first resistance means, the input terminals of said bridge rectifier being connected through said first resistance means to the terminals of said output capacitor, a controlled rectifier having anode, cathode and control electrodes, the anode and cathode electrodes of said controlled rectifier being connected in circuit relation with the output terminals of said bridge rectifier, the anode electrode of said controlled rectifier being connected to the positive output terminal of said bridge rectifier, the cathode electrode being connected to the negative output terminal of said bridge rectifier, first capacitance means connected in circuit relation with the output terminals of said bridge rectifier and charged to a certain potential, second capacitance means, second resistance means, said second capacitance means and said second resistance means being connected in parallel circuit relation and the parallel circuit connected in series circuit relation with the anode and cathode electrodes of said controlled rectifier, third and fourth resistance means connected in series circuit relation with the output terminals of said bridge rectifier, said third resistance means being connected to the positive output terminal of said bridge rectifier, said fourth resistance means being connected to the negative output terminal of said bridge rectifier, the control electrode of said controlled rectifier being connected to the junction of said third and fourth resistance means, third capacitance means, said third capacitance means being connected across said third resistance means, said third capacitance means and said third and fourth resistance means applying a signal to the control electrode of said controlled rectifier of sufficient magnitude to cause said controlled rectifier to switch to a conducting state when an electrical quantity applied to said bridge rectifier exceeds predetermined limits, said first capacitor means discharging through said controlled rectifier, said second resistance means and said second capacitance means when said controlled rectifier becomes conductive, said second resistance means controlling the discharge rate of said first capacitor means, said second capacitor means being charged during the period said controlled rectifier is conductive, said controlled rectifier remaining conductive until said first capacitor means has substantially discharged, said second capacitor means discharging through said second resistor means when said controlled rectifier becomes non-conductive.

No references cited.

MILTON O. HIRSHFIELD, *Primary Examiner.*